(12) United States Patent
Ekmedžić et al.

(10) Patent No.: US 8,851,418 B2
(45) Date of Patent: Oct. 7, 2014

(54) LANDING GEAR ATTACHMENT

(75) Inventors: Andrija Ekmedžić, Bristol (GB); Mario Straccia, Bristol (GB); Philip Jones, Bristol (GB)

(73) Assignee: Airbus Operations Limited, Bristol (GB)

( * ) Notice: Subject to any disclaimer, the term of this patent is extended or adjusted under 35 U.S.C. 154(b) by 69 days.

(21) Appl. No.: 13/569,528

(22) Filed: Aug. 8, 2012

(65) Prior Publication Data

US 2013/0048783 A1    Feb. 28, 2013

(30) Foreign Application Priority Data

Aug. 22, 2011   (GB) ................................... 1114437.5

(51) Int. Cl.
| | | |
|---|---|---|
| B64C 25/10 | (2006.01) | |
| B64C 25/14 | (2006.01) | |
| B64C 25/20 | (2006.01) | |
| B64C 25/04 | (2006.01) | |

(52) U.S. Cl.
CPC ...................................... *B64C 25/04* (2013.01)
USPC ............... 244/102 R; 244/103 R; 244/102 A

(58) Field of Classification Search
CPC ........ B64C 25/02; B64C 25/04; B64C 25/10; B64C 25/12; B64C 25/14; B64C 25/18; B64C 25/20
USPC .................. 244/100 R, 102 R, 102 A, 103 R
See application file for complete search history.

(56) References Cited

U.S. PATENT DOCUMENTS

| | | | |
|---|---|---|---|
| 4,155,522 A | 5/1979 | Sealey | |
| 4,328,939 A | 5/1982 | Davies et al. | |
| 4,392,622 A | 7/1983 | McClaflin | |
| 4,392,623 A * | 7/1983 | Munsen et al. | 244/102 R |
| 5,547,148 A | 8/1996 | Del Monte et al. | |
| 6,679,452 B1 * | 1/2004 | Cottet et al. | 244/102 R |
| 6,857,598 B2 * | 2/2005 | Adamson et al. | 244/15 |
| 7,793,885 B2 | 9/2010 | Anderton et al. | |
| 2004/0245375 A1 * | 12/2004 | Adamson et al. | 244/15 |
| 2006/0006282 A1 | 1/2006 | Mellor et al. | |

FOREIGN PATENT DOCUMENTS

| | | |
|---|---|---|
| GB | 1 517 127 | 7/1978 |
| GB | 2 320 002 | 6/1998 |
| GB | 2 417 933 | 3/2006 |

OTHER PUBLICATIONS

Search Report for GB 1114437.5, dated Dec. 20, 2011.

* cited by examiner

*Primary Examiner* — Philip J Bonzell
(74) *Attorney, Agent, or Firm* — Nixon & Vanderhye P.C.

(57) ABSTRACT

A landing gear attachment apparatus (100) has a landing gear side bearing retention arrangement (104) connected to an aircraft side attachment apparatus (102), held together by a series of fuse pins. The interaction between a fuse pin carrier and a trunnion block varies the amount of load required to separate the landing gear from the fuselage depending on the direction of the load.

15 Claims, 6 Drawing Sheets

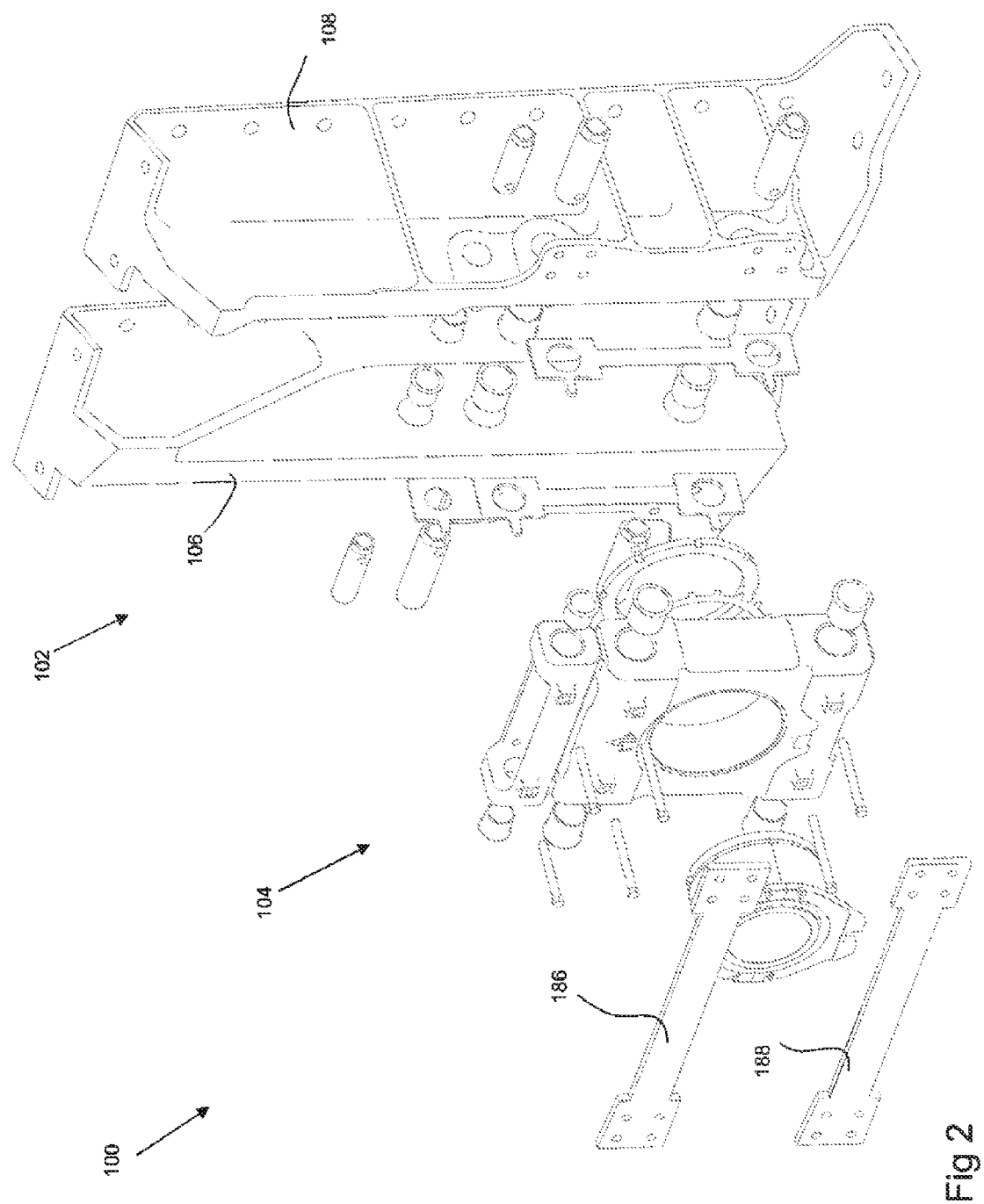

LANDING GEAR ATTACHMENT

This application claims priority to GB Patent Application No. 1114437.5 filed 22 Aug. 2011, the entire contents of which is hereby incorporated by reference.

The present invention is concerned with a landing gear attachment. More specifically, the present invention is concerned with a landing gear attachment for use in a commercial passenger aircraft which landing gear attachment is designed to release the landing gear from the aircraft at a predetermined force level to prevent damage to the fuselage and/or wing in the event of an unexpected impact.

Aircraft landing gear may be attached to the wing and/or fuselage in a variety of manners. Two known types of landing gear attachment architecture are:

i) gear beam, in which a diagonal beam spans the fuselage and the wing trailing edge, and the landing gear trunnion extends in a fore aft direction between the wing trailing edge and a point midway along the beam, and;

ii) gear rib, in which a rib is cantilevered from the wing trailing edge to provide an attachment point for a fore-aft trunnion spanning the wing trailing edge and the attachment point.

It is known, for example from U.S. Pat. No. 4,392,623 and U.S. Pat. No. 4,392,622 within the field of gear beam landing gear attachments to provide a fusible pin connection between the beam and the wing trailing edge. This fusible pin connection is designed to fail at a predetermined load in order to release the landing gear from the aircraft should upon, for example impact with an unseen and unavoidable obstacle. The detachment of the landing gear in such an event preserves the integrity of the aircraft fuselage and wings.

It has been recognised in the prior art, in particular in U.S. Pat No. 4,392,622 and U.S. Pat. No. 4,392,623, that it is desirable to allow the attachment to fail at different loads depending on the direction of impact.

A problem with the prior art is that the attachments disclosed therein are very specific to the disclosed landing gear architecture. For example, in U.S. Pat. No. 4,392,622 and U.S. Pat. No. 4,392,923 only teach how the subject attachment can be used on one particular point on a gear beam assembly. It is not obvious how the technology could be adapted for use on other types of main gear (e.g. in a gear rib architecture) or for use on nose mounted gear.

It is an aim of the present invention to provide an improved landing gear attachment which may be used on a wider range of landing gear configurations.

According to the invention, there is provided an aircraft landing gear attachment comprising: an aircraft mount, a trunnion block, in which the trunnion block is connected to the mount such that a force applied to the trunnion block in a first direction separates the trunnion block and the mount at a first predetermined force level, and a force applied to the trunnion block in a second different direction separates the trunnion block and the mount at a second different predetermined force level.

By "trunnion block" we mean a subassembly suitable for rotatably receiving a trunnion bar of a landing gear. The trunnion block is a common feature of retractable passenger aircraft landing gear, regardless of the mounting architecture. In order to retract, the gear needs to be rotatably mounted on a trunnion, and as such by providing a frangible connection between the trunnion and a mounting member, the invention is suitable for a wide range of landing gear attachment architectures.

Preferably the trunnion block is attached to the mount by a first frangible connection. The frangible connection can be engineered to fail at a predetermined load.

Preferably a reaction block is positioned in abutment with the trunnion block, the reaction block attached to the mount by a second frangible connection, wherein the reaction block is positioned in the first direction relative to the trunnion block. This means that a force in the second direction will need to fail both frangible connections because the trunnion block and the reaction block are in abutment, thus requiring a higher load to fail.

Preferably the reaction block and the trunnion block are in abutment but detached. Therefore a force in any other direction will not fail the second frangible connection because the trunnion block will not need to push the reaction block out of the way, Preferably the first and second frangible connections comprise at least two discrete frangible attachments on opposite sides of both the trunnion block and reaction block. This provides stability.

Preferably the trunnion block and the reaction block are positioned between two support members of the mount to constrain their motion in at least one degree of freedom.

Preferably at least one of the first and second frangible connections comprises a shear pin spanning the trunnion block and mount and/or the reaction block and mount. The shear pin(s) may be hollow.

Preferably the shear pin(s) has/have a wall thickness which is thinner at a shear plane defined where the trunnion block and mount meet and/or the reaction block and mount meet.

An aircraft landing gear comprising a landing gear attachment according to the first aspect is also provided by the invention, as is an aircraft comprising such a landing gear.

An example aircraft landing gear attachment in accordance with the present invention will now be described with reference to the accompanying figures in which:—

FIG. 2 is an exploded perspective view of a landing gear attachment in accordance with the present invention;

Figure 1A:
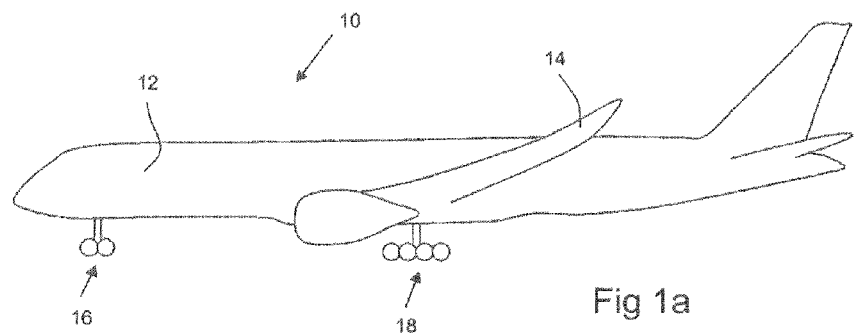
FIG. 1a is a side view of an aircraft.

Turning to FIG. 1a, an aircraft 10 is shown in profile having a fuselage 12 and a first (left hand) wing 14. The aircraft 10 comprises a nose landing gear 16 and a first main landing gear 18. It will be understood that a second main landing gear is provided on the opposite side of the aircraft behind the first landing gear 18.

Figure 1B:
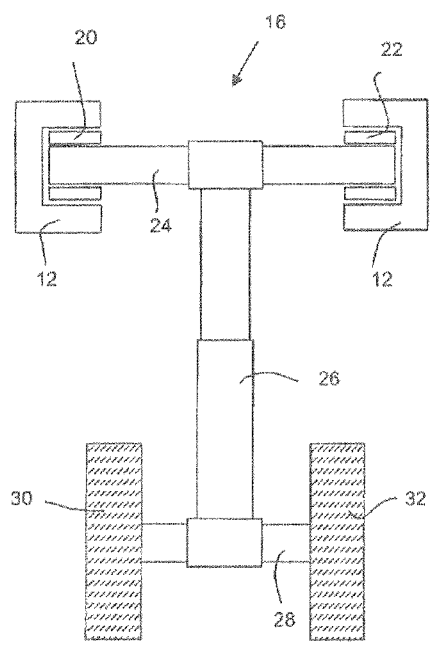
FIG. 1b is a schematic view of a known nose landing gear assembly.

Turning to FIG. 1b, the nose landing gear 16 is shown schematically. A pair of trunnion blocks 20, 22 (i.e. bearings) are provided and attached to the aircraft fuselage 12. Within the trunnion blocks 20, 22, a trunnion bar 24 is rotatably mounted which in turn is connected at its mid point to an oleo strut 26. The opposite end of the oleo strut 26 is connected to an axle 28 having opposing wheel sets 30, 32 rotatably installed on opposite ends thereof. The design and function of the oleo strut 26 is well known in the art of landing gear design.

Figure 1C:
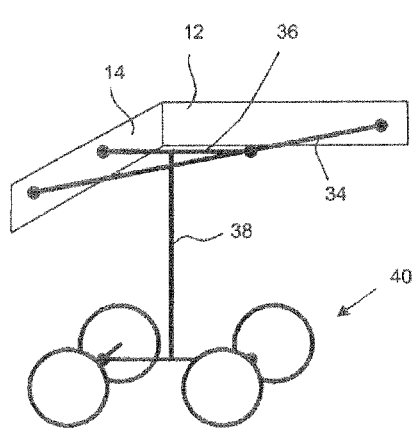
FIG. 1c is a schematic view of a gear beam type attachment for an aircraft landing gear assembly.

Turning to FIG. 1c, an example arrangement for a gear beam type main landing gear mounting assembly is shown. Part of the fuselage 12 and wing spar 14 can be seen in which a gear beam 34 extends therebetween, on the diagonal. A trunnion bar 36 extends in a fore-aft direction between the gear beam 34 and the wing spar 14. Per the fore landing gear in FIG. 1b, an oleo strut 38 extends downwardly from the trunnion to connect to a wheel assembly 40.

Figure 3:
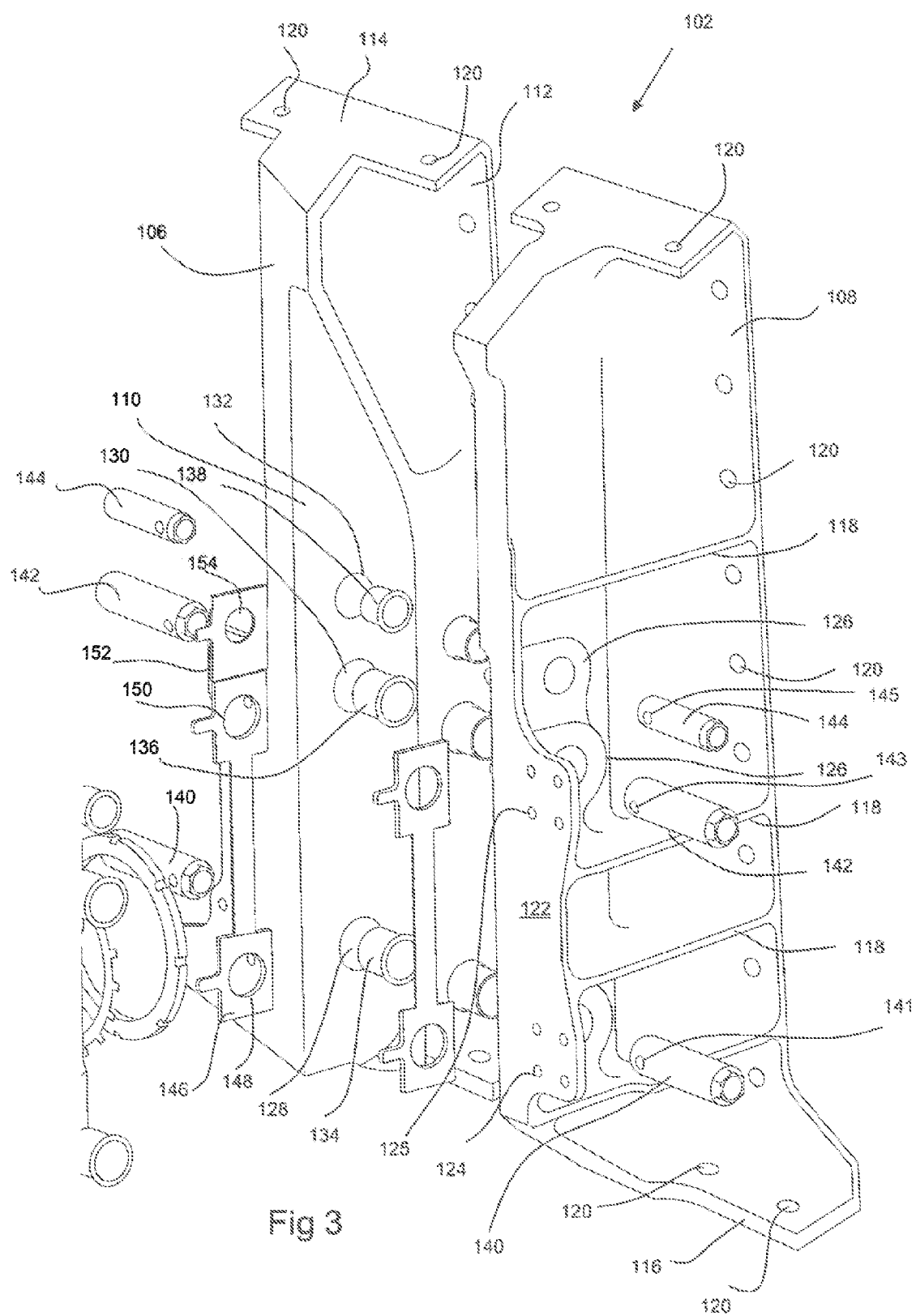
FIG. 3 is a close-up view of a part of the attachment of FIG. 2.
Figure 4:
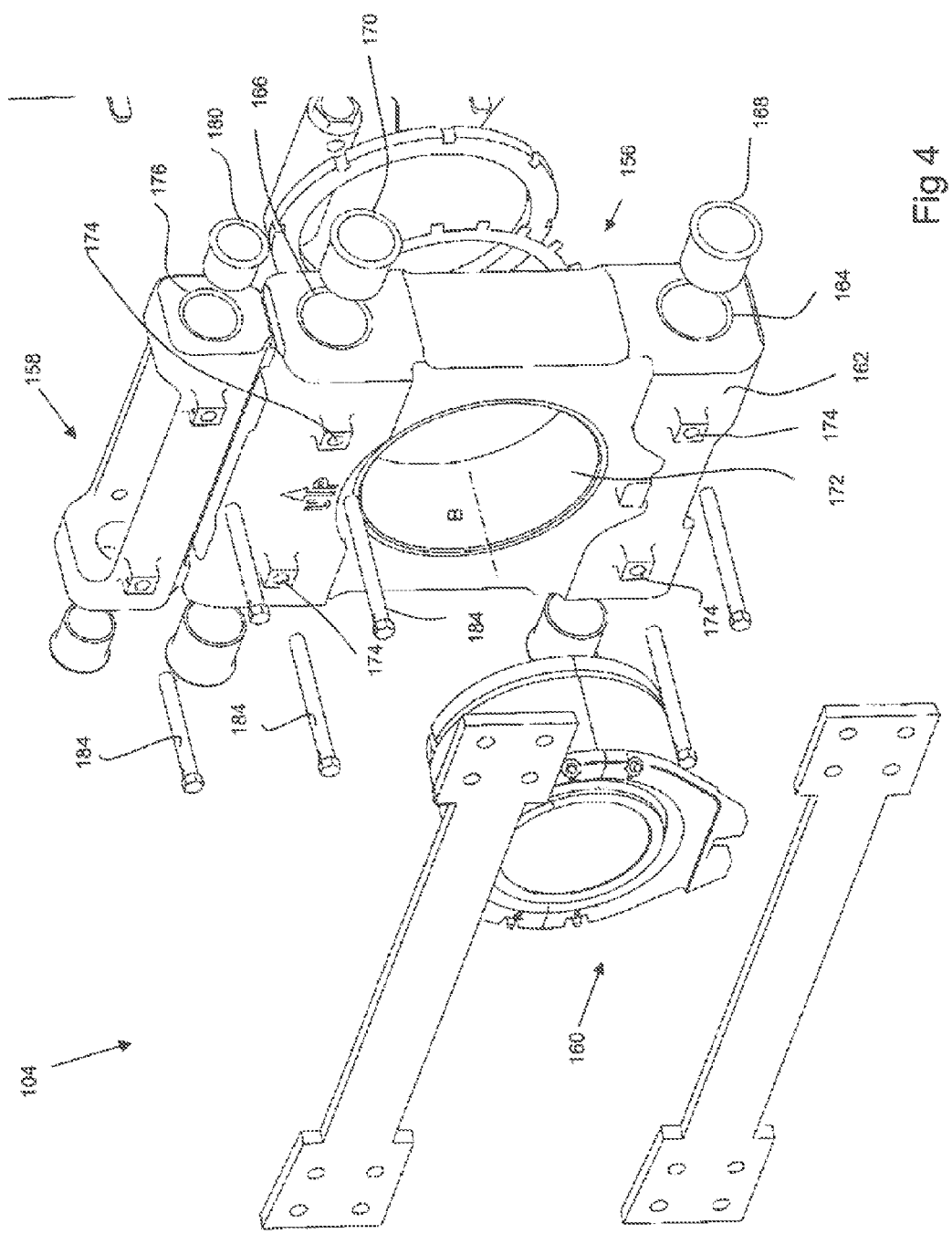
FIG. 4 is a close-up view of different part of the attachment of FIG. 2.

Turning to FIGS. 2, 3 and 4, an attachment 100 is shown in accordance with the present invention. The landing gear attachment 100 comprises an aircraft side assembly 102 and a gear side assembly 104. The aircraft side assembly 102 is shown in detail in FIG. 3, and the gear side assembly 104 is shown in detail in FIG. 4.

The aircraft side assembly 102 comprises a first fitting 106 and a second fitting 108. The fittings 106, 108 are substantially similar and mirror images of each other. As such, a single reference numeral is used for like features on fittings 106, 108.

Each of the fittings 106, 108 comprises a rectangular, elongate plate section 110 which is connected along a first long side to a midline of a transverse flange 112 substantially perpendicular to the plate section 110, to form a "T" section. End flanges 114, 116 are provided at either short end of the plate section 110 and transverse flange 112.

A tension flange 122 is provided at the opposite side of the elongate plate section 110 to the transverse flange 112 extending from the end flange 116 to midway along the elongate plate section 110. The tension flange 122 comprises a series of tension strap attachment formations 124, 125 in the form of four bores. A first attachment formation 124 is provided proximate the end flange 116, and a second formation 125 at the opposite end of the tension flange 122 to the end flange 116.

A plurality of reinforcing ribs 118 are provided spanning the elongate plate section 110, the transverse flange 112 and the tension flange 122.

Each of the flanges 112, 114, 116 comprises a series of attachment formations 120 in the form of bores which can be used to attach the fittings, 106, 108 to an appropriate aircraft structure (depending on the landing gear architecture chosen) with mechanical fasteners in order to secure the landing gear in place.

The elongate plate section 110 comprises a series of reinforced bosses 126 on the reinforcement rib side thereof. A first shear pin bore 128 is provided through the elongate plate section 110 proximate the end flange 116. A second and third shear pin bores 130, 132 are provided midway up the elongate plate section 110. The second and third shear pin bores 130, 132 are relatively close compared to the distance from the second shear pin bore to the first shear pin bore 128. The third shear pin bore 132 is smaller in diameter than the first and second bores 128, 130.

Each of the shear pin bores 128, 130, 132 is provided with a corresponding bush 134, 136, 138. Each bush is substantially similar and comprises a collar section ending in a circumferential flange. Each of the bushes 134, 136, 138 is inserted from the side of the fitting 106, 108 facing the opposite fitting 106, 108. The circumferential flange on each of the bushes holds them in place.

For each of the fittings 106, 108, three fuse pins 140, 142, 144 are provided. Each pin is adapted to fit within the bushes 134, 136, 138 respectively. As such, the fuse pins 140, 142 arranged to fit within the bushes 134, 136 are larger than the smaller fuse pin 144 arranged to fit in the bush 138. The structure of the fuse pins will be described in more detail below, however each defines a radial retention pin bore 141, 143, 145 respectively.

A first spacer 146 has a predetermined thickness and a pair of spaced bores 148, 150 to receive the first and second fuse pins 140, 142 respectively. The spacer 146 may be optionally utilised as will be discussed further below. Similarly, a further optional spacer 152 is provided having a bore 154 in order to receive the third fuse pin 144.

When assembled the edges of the flanges 112, 114, 116 of each of the fittings 106, 108 abut to provide a predetermined gap between the elongate plate sections 110.

Turning to FIG. 4, the gear side assembly 104 is shown in more detail. The gear side assembly 104 comprises a trunnion block 156 and a reaction block in the form of a fuse pin carrier 158. A spherical bearing 160 is provided which is configured to receive one end of a landing gear trunnion bar such as trunnion bar 24 in FIG. 1b.

The trunnion block 156 comprises a generally rectangular body 162 having two fuse pin receiving bores 164, 166 defined on each opposite side thereof. Respective bushes 168, 170 are installed in each of the fuse pin receiving bores 164, 166. In a main face of the trunnion bar 156, a bearing receiving bore 172 is defined which has a main axis B perpendicular to the fuse pin receiving bores 164, 166 and is arranged to receive the spherical bearing 160.

Parallel to the bearing receiving bore 172, a series of four retaining pin bores 174 are provided, each of which is in communication with one of the fuse pin receiving bores 164, 166.

The fuse pin carrier 158 is positioned to abut the top end of the trunnion block 156, is of substantially the same width and is generally rectangular in nature, having a single fuse pin receiving bore 176 defined on each end thereof (parallel to and offset from the fuse pin bores of the trunnion block). The fuse pin carrier 158 is also provided with respective bushes 180, for insertion within the fuse pin receiving bores 176.

In order to assemble the attachment formation 100, the trunnion block 156 and fuse pin carrier 158 are inserted so as to sit between the first and second fittings 106, 108 such that the fuse pin receiving bores 164, 166 of the trunnion block 156, align with the fuse pin bores 128, 130 of the fittings 106, 108 respectively. Similarly, the fuse pin carrier 158 is inserted such that its fuse pin bores 176 align with the bores 132 of the first and second fittings 106, 108. Once aligned, retaining pins 184 (one is provided one for each fuse pin) are inserted into retaining pin bores 174 and thereby into the retaining pin bores 141, 143, 145 such that the fuse pins are held in place. Cross bolts (not shown) are also provided to hold the retaining pins 184 in position within the trunnion block and fuse pin carrier. The cross bolts are oriented radially with respect to the retaining pins and secure them to the relevant body.

Finally, a pair of tension straps 186, 188 are provided to span the tension flanges 122 of the first and second fittings 106, 108 to hold them together and thus restrain the trunnion bar 156 and the fuse pin carrier 158.

It will be appreciated that should they be required, the spacers 146, 152 can be used to take up any play between the width of the trunnion block 156 and the fuse pin carrier 158 and the respective flanges of the fittings 106, 108.

Figure 5A:
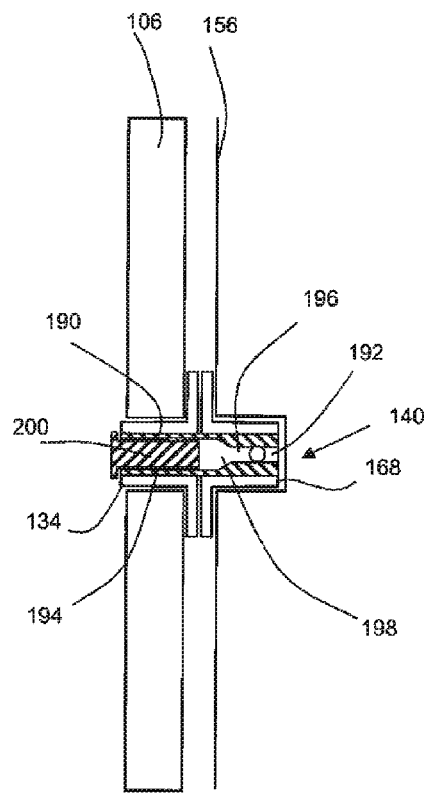
FIG. 5a is a side section view of a first fuse pin for use in the landing gear attachment of the present invention.

Referring to FIG. 5a, a first design of a fuse pin 140 is shown. The fuse pin 140 is shown mounted between the fitting 106 and the trunnion block 156. The bushes 134 and 168 are also shown.

The fuse pin 140 comprises a generally cylindrical body 190 which sits within the bushes 134, 168. The body 190 defines a bore 192 which has a large diameter portion 194 and a small diameter portion 196. A frustro-conical transition 198 divides the large and small portions 194, 196. A solid spigot 200 is inserted into the larger diameter portion 194 and is sized to terminate at the point between the fitting 106 and the trunnion bar 156, i.e. on the shear plane between those two components. As such, should those two components be urged in opposite directions to each other, the fuse pin 140 will fail at that point. In other words, the spigot 200 provides a stress concentration at the shear plane.

Figure 5B:
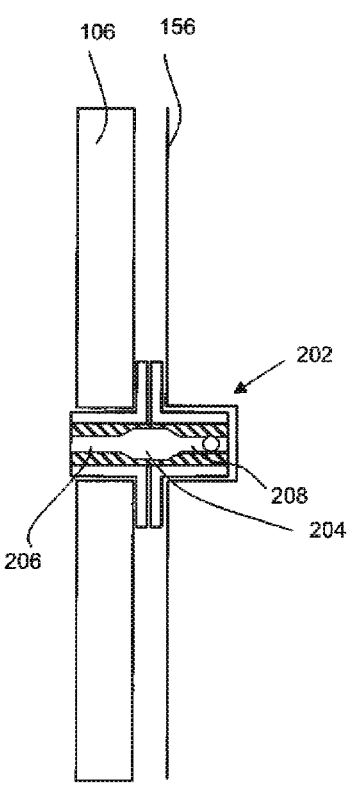
FIG. 5b is a side section view of a second fuse pin for use in the landing gear attachment of the present invention.

Turning to FIG. 5b, an alternative fuse pin 202 is shown installed between the fitting 106 and the trunnion bar 156. Instead of using a spigot 200, the fuse pin 202 has a large central diameter portion 204 and opposing smaller end diameter portions 206, 208. It will be noted that this fuse pin 202 is more difficult to manufacture but shares a common, thinner wall thickness (i.e. larger bore diameter) in the region of the shear plane between the fitting 106 and the trunnion block 156 per fuse pin 140.

Figure 5C:
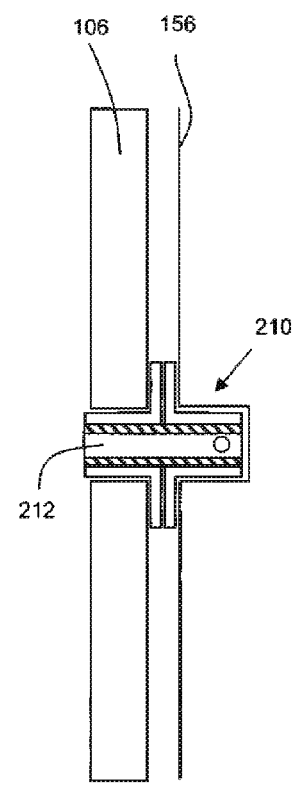
FIG. 5c is a side section view of a third fuse pin for use with the landing gear attachment of the present invention.

Finally, a third fuse pin 210 is shown in FIG. 5c, which has a constant diameter bore 212 running therethrough.

Figure 6:
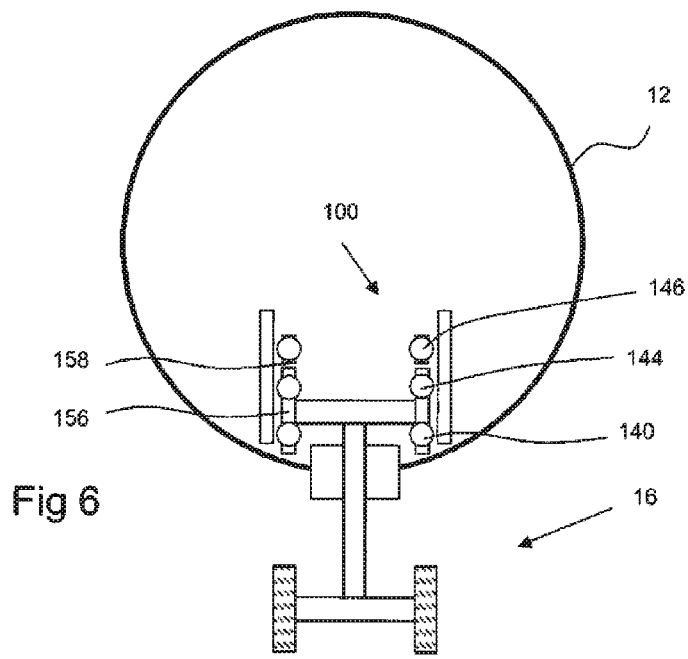
FIG. 6 is a schematic view of a landing gear attachment according to the present invention installed as a nose landing gear.

Turning to FIG. 6, an aircraft fuselage 12 is shown in which nose gear 16 is shown having an attachment formation according to the present invention.

The locations of the trunnion block 156, fuse pin carrier 158 and the three sets of fuse pins 140, 142, 144 is shown schematically.

Figures 7A, 7B, 7C:
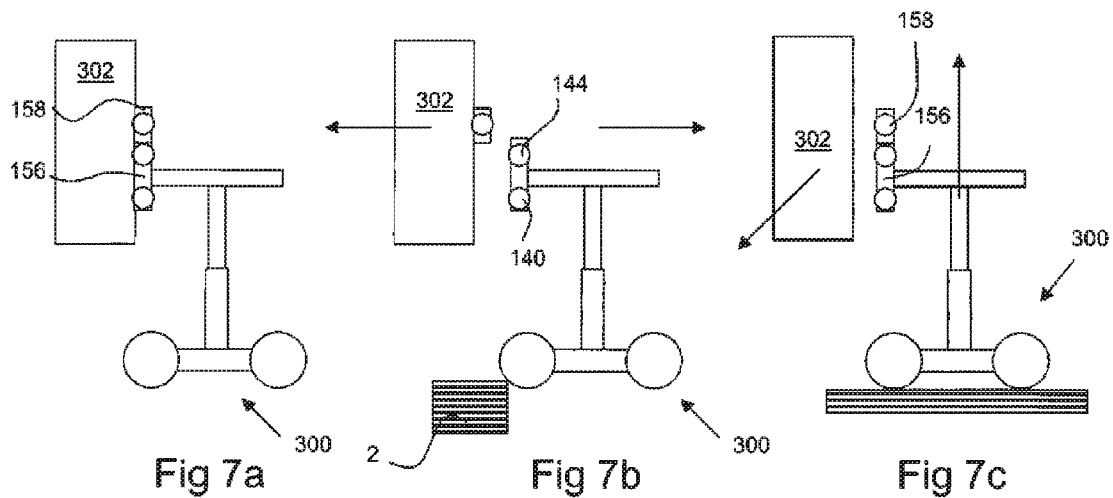
FIG. 7a is a schematic side view of a landing gear attachment according to the present invention installed as a main landing gear.
FIG. 7b is a side view of the landing gear of FIG. 7a under a first load condition.
FIG. 7c is a side view of the landing gear of FIG. 7a under a second load condition.

Referring to FIGS. 7a to 7c, various different load cases are shown.

FIG. 7a shows a side view of a main landing gear 300 attached to a wing 302. In FIG. 7b, an obstacle 2 has been hit by the landing gear 300 such that the landing gear 300 and wing 302 are urged in opposite horizontal directions. As this occurs, the fuse pins 140, 144 are ruptured and the landing gear 16 detaches from the fuselage 12. The tension straps 186, 188 hold the fittings 106, 108 together until the fuse pins are sheared, at which point under the force of the rearwardly moving trunnion block 156, the tension straps 186, 188 rupture to allow separation. This may be achieved by the use of tension strap mounts which are designed to hold the fittings together under axial loading, but fail as the trunnion block loads the straps in a transverse (aft) direction.

Turning to FIG. 7c, a heavy landing scenario is shown in which the landing gear 300 is urged relatively upwardly compared to the wing 302. Under these circumstances, the trunnion block 156 pushes against the fuse pin carrier 158 such that both are detached and all three pairs of fuse pins are ruptured simultaneously. In this instance, the tension straps 186, 188 act to retain the fittings 106, 108 such that the fuse pins fail in shear. The straps 186, 188 are not required to rupture in this load case.

As can be seen by the above example, different load cases require different amounts of force in order to separate the landing gear 300 and the wing 302. In the situation shown in FIG. 7c, all three pairs of fuse pins fuse pins need to be sheared which requires a higher load than that shown in FIG. 7b. As such, the detachment of the landing gear can be tailored depending on the severity of the load case to the aircraft hull integrity. In the above example, a heavy landing-type load case would be less likely to cause hull integrity breach than the obstacle located in FIG. 7b and, as such, the landing gear can withstand a higher force in an upward direction with respect to the wing than a sideways force.

Variations fall within the scope of the present invention.

The fittings 106, 108 may be a unitary component.

It is possible for each of the bushes 134, 136, 138 to have a flange at either end (as such they may be two-part).

It will be appreciated that two pairs of fuse pins may be used instead of three (i.e. one pair on the trunnion block, and one pair on the fuse pin carrier). Alternatively, more than three pairs may be used.

The invention claimed is:

1. An aircraft landing gear attachment comprising:
an aircraft mount;
a trunnion block;
a reaction block positioned in first direction relative to the trunnion block, in abutment with the trunnion block but detached from the trunnion block, wherein in which the trunnion block is connected to the mount by a first frangible connection such that a force applied to the trunnion block in said first direction separates the trunnion block and the mount at a first predetermined force level, and said reaction block is attached to the mount by a second frangible connection and a force applied to the trunnion block in a second direction different from said first direction separates the trunnion block and the mount.

2. An aircraft landing gear attachment according to claim 1 in which the first and second frangible connections comprise at least two discrete frangible attachments on opposite sides of both the trunnion block and reaction block.

3. An aircraft landing gear attachment according to claim 1 in which the trunnion block and the reaction block are positioned between two support members of the mount to constrain their motion in at least one degree of freedom.

4. An aircraft landing gear attachment according to claim 3, in which the first and second fittings are unitary.

5. An aircraft landing gear attachment according to claim 3, in which the first fitting comprises a first plate section, the second fitting comprises a second plate section facing the first plate section, the trunnion block and the reaction block being connected to the first and second plate sections.

6. An aircraft landing gear attachment according to claim 5, in which the first and second plate sections are parallel.

7. An aircraft landing gear attachment according to claim 5, in which:
the trunnion block comprises a first trunnion block fuse pin receiving bore facing the first plate section, and a second trunnion block fuse pin receiving bore facing the second plate section;
the first plate section comprises a first plate section fuse pin receiving bore; and,
the second plate section comprises a second plate section fuse pin receiving bore;
the aircraft landing gear attachment comprising:
a first fuse pin engaged with the first trunnion block fuse pin receiving bore and the first plate section fuse pin receiving bore; and,
a second fuse pin engaged with the second trunnion block fuse pin receiving bore and the second plate section fuse pin receiving bore.

8. An aircraft landing gear attachment according to claim 3, comprising at least one tension strap extending between the first and second fittings across the trunnion block to retain the trunnion block between the first and second fittings upon movement in the first direction.

9. An aircraft landing gear attachment according to claim 8, in which the at least one tension strap is connected to the first and second fittings via tension strap mounts configured to fail at a predetermined load.

10. An aircraft landing gear attachment according to claim 1 in which at least one of the first and second frangible connections comprises a shear pin spanning the trunnion block and mount and/or the reaction block and mount.

11. An aircraft landing gear attachment according to claim 10, in which the mount comprises a first fitting and a second fitting, the landing gear attachment comprising:
- a first pair of trunnion block shear pins spanning the trunnion block and the first fitting;
- a second pair of trunnion block shear pins spanning the trunnion block and the second fitting, the second pair of trunnion block shear pins being opposite the first pair of trunnion block shear pins;
- a first reaction block shear pin spanning the reaction block and the first fitting; and
- a second reaction block shear pin spanning the reaction block and the second fitting the second reaction block shear pin being opposite the first reaction block shear pin.

12. An aircraft landing gear attachment according to claim 10 in which the shear pin is hollow.

13. An aircraft landing gear attachment according to claim 12 in which the shear pin has a wall thickness which is thinner at a shear plane defined where the trunnion block and mount meet and/or the reaction block and mount meet.

14. An aircraft landing gear comprising a landing gear attachment according to claim 1.

15. An aircraft comprising a landing gear according to claim 14.

\* \* \* \* \*